United States Patent
Lyle et al.

(10) Patent No.: US 9,760,652 B2
(45) Date of Patent: Sep. 12, 2017

(54) HIERARCHICAL STORAGE ARCHITECTURE USING NODE ID RANGES

(75) Inventors: Robert William Lyle, Morgan Hill, CA (US); Edison Lao Ting, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1303 days.

(21) Appl. No.: 10/870,924

(22) Filed: Jun. 21, 2004

(65) Prior Publication Data

US 2006/0004792 A1 Jan. 5, 2006

(51) Int. Cl.
*G06F 17/30* (2006.01)

(52) U.S. Cl.
CPC ................. *G06F 17/30911* (2013.01)

(58) Field of Classification Search
None
See application file for complete search history.

(56) References Cited

U.S. PATENT DOCUMENTS

| | | | | |
|---|---|---|---|---|
| 5,285,528 | A * | 2/1994 | Hart | 710/200 |
| 5,568,638 | A * | 10/1996 | Hayashi et al. | 707/1 |
| 6,175,835 | B1 * | 1/2001 | Shadmon | 707/102 |
| 6,804,677 | B2 * | 10/2004 | Shadmon et al. | 707/101 |
| 6,901,403 | B1 * | 5/2005 | Bata et al. | |
| 7,383,286 | B2 * | 6/2008 | Hamanaka et al. | 707/694 |
| 2002/0087596 | A1 * | 7/2002 | Lewontin | 707/513 |
| 2002/0114341 | A1 | 8/2002 | Sutherland et al. | 370/428 |
| 2002/0120598 | A1 * | 8/2002 | Shadmon et al. | 707/1 |
| 2002/0138353 | A1 * | 9/2002 | Schreiber et al. | 705/26 |
| 2003/0061216 | A1 | 3/2003 | Moses | 707/9 |
| 2003/0070144 | A1 | 4/2003 | Schnelle et al. | 715/513 |
| 2003/0110150 | A1 * | 6/2003 | O'Neil et al. | 707/1 |
| 2003/0145041 | A1 | 7/2003 | Dunham et al. | 709/203 |
| 2003/0204515 | A1 * | 10/2003 | Shadmon et al. | 707/100 |
| 2004/0122950 | A1 * | 6/2004 | Morgan et al. | 709/226 |
| 2004/0172387 | A1 * | 9/2004 | Dexter et al. | 707/3 |

(Continued)

FOREIGN PATENT DOCUMENTS

EP 1265130 12/2002 ............... G06F 7/32

OTHER PUBLICATIONS

Quanzhong Li et al. "Indexing and Querying XML Data for Regular Path Expressions" Proceedings of the 27th VLDB Conference 2001 pp. 361-370.*

(Continued)

*Primary Examiner* — Charles Adams
(74) *Attorney, Agent, or Firm* — Cuenot, Forsythe & Kim, LLC

(57) ABSTRACT

A system and method for managing and storing logically grouped hierarchical data via physical block storage is provided. Logical groups of parsed XML node data forming node ID ranges are indexed by creating and inserting an index entry into a node ID range. Index entries indicate node ID range bounds for blocks in which nodes are stored. Consulting a node ID range index facilitates XML node traversal via logical links between nodes in different blocks. Additionally, physical links between nodes within a block allow for fast node traversal. Node update including insertion and deletion as well as document order based pre-fetch and XML document re-organization is also facilitated by this architecture.

16 Claims, 19 Drawing Sheets

(56) References Cited

U.S. PATENT DOCUMENTS

| | | | |
|---|---|---|---|
| 2005/0018152 A1* | 1/2005 | Ting et al. | 353/121 |
| 2005/0033733 A1* | 2/2005 | Shadmon et al. | 707/2 |
| 2005/0055334 A1* | 3/2005 | Krishnamurthy | 707/2 |
| 2005/0102256 A1* | 5/2005 | Bordawekar et al. | 707/1 |

OTHER PUBLICATIONS

McHugh et al. "Indexing Semistructured Data" Stanford University pp. 1-21.*
Jagadish et al, "Timber: A native XMl database" The VLDB Journal 2002, pp. 274-291.*
Fieberg et al. "Natix: A Technological Overview" Web databases and Web services 2002, LNCS 2493, pp. 12-33, 2003.*
Fiebig et al. "Anatomy of a native XML base managment system" The VLDB Journal 2002 pp. 292-314.*
Kanne et al, "Efficient storage of XML data" Jun. 16, 1999.*
Zachary Ives et al., "An XML query engine for network-bound data," *The International Journal of Very Large Data Bases*, V11, N4, Dec. 13, 2002, pp. 380-402.
Yuanying Mo et al., "Storing and Maintaining Semistructured Data Efficiently in an Object-Relational Database," *The Third International Conference on Web Information Systems Engineering (WISE '00)*, Dec. 12-14, 2002, Singapore, 10pgs.

* cited by examiner

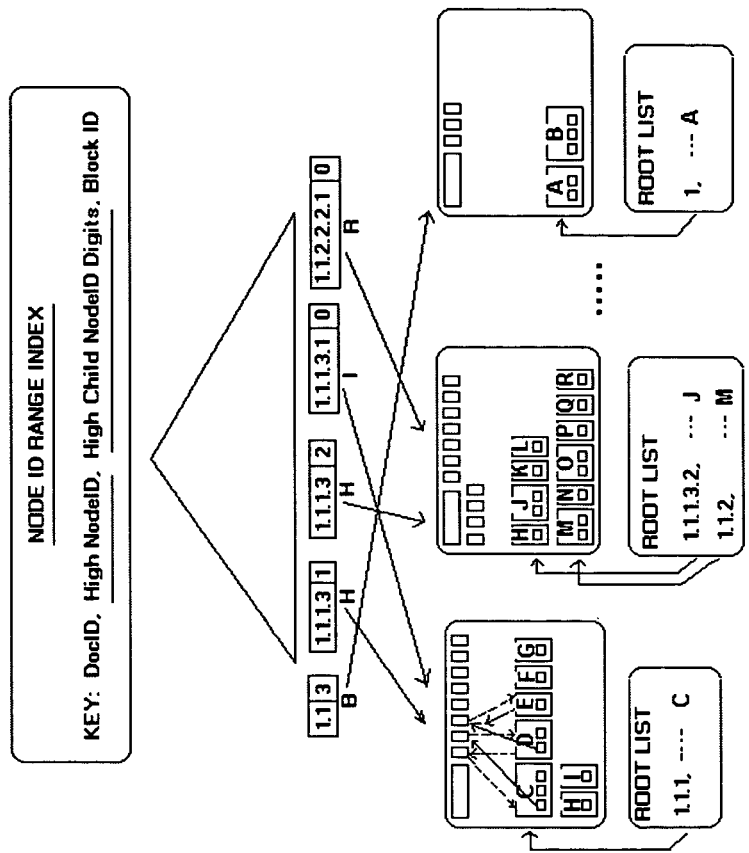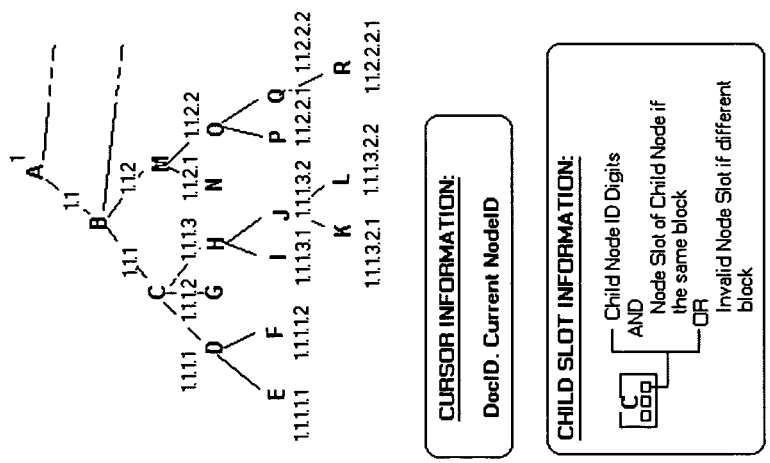
FIGURE 1

HIERARCHICAL STORAGE ARCHITECTURE USING NODE ID RANGES

RELATED APPLICATIONS

This application is related to the application entitled "Extensible Decimal Identification System for Ordered Nodes", now U.S. Ser. No. 10/605,448, which is hereby incorporated by reference in its entirety, including any appendices and references thereto. This application is also related to the application entitled "Isolated Ordered Regions (IOR) Node Order", now U.S. Ser. No. 10/604,450, which is hereby incorporated by reference in its entirety, including any appendices and references thereto.

BACKGROUND OF THE INVENTION

Field of Invention

The present invention relates generally to the field of hierarchical node management. More specifically, the present invention is related to node storage, location, and grouping via physical and logical identifiers.

Discussion of Prior Art

A tree structure comprising nodes is a type of data structure in which each element is attached to one or more elements directly beneath it. The connections among elements in a tree structure are called branches. Trees are often called inverted trees because they are normally drawn with the root at the top. Inverted trees are the data structures used to represent hierarchical file structures. In this case, the leaves are files and the other elements above the leaves are directories.

Tree structures have been used in prior art data processing systems to organize data. But, a disadvantage with such prior art is that they fails to provide for a node identification system for ordered nodes wherein adding or deleting a child node (or a subtree of nodes) from a hierarchical structure of nodes still maintains the order and relationships between the parent, child, and sibling nodes. Node identification solutions based upon assigning preorder traversal and/or postorder traversal numbers can only provide an ordering solution as such solutions cannot be used to identify sibling relationships between nodes.

Yet another disadvantage of such prior art systems is that they fail to address storage architectures for hierarchical data providing the advantage of having physical links between the nodes (for fast traversal) and also providing the advantage of having logical links between nodes (for easier updating, versioning, and reorganization).

The following references provide a general teaching in ordering nodes, but they fail to provide for a solution that incorporates advantages of both the physical and logical storage architectures.

The patent application publication to Sutherland et al. (2002/0114341 A1) discloses a peer-to-peer storage system that includes a storage coordinator that centrally manages distributed storage resources in accordance with system policies. The storage resources are otherwise unused portions of storage media, e.g., hard disks, that are included in the devices such as personal computers, workstations, laptops, file servers, and so forth, that are connected to a corporate computer network. The devices are referred to collectively as "storage nodes." The storage coordinator manages the distributed storage resources by assigning the nodes to various groups and allocating the storage resources on each of the nodes in a given group to maintaining dynamically replicated versions of the group files.

The patent application publication to Schnelle et al. (2003/0070144) discloses the conversion of an XML encoded dataset into a minimal set of SQL tables. In the disclosed method, a hierarchical structure in the XML encoded dataset is identified. A node element set for the XML encoded dataset is determined, wherein each node element in the node element set is a discrete level of the hierarchical structure of the dataset. One or more nodes of the XML encoded dataset are determined, each node being an instance of a node element. A unique node identifier is allocated to each node. Then, an SQL node table containing one or more records is generated, each record corresponding to a respective one of the allocated node identifiers. An SQL ancestry table is optionally generated to define the interrelationships among nodes of the identified hierarchical structure of the XML encoded dataset.

The patent application publication to Moses (2003/0061216) discloses a system and method for controlling access to data within a hierarchically organized document, such as an XML document. Elements may have their access rights specified, for example as a variable in an XML tag. If not specified within an element of the document, access rights are inherited from its nearest ancestor. Specified access rights may refer to a collection of entitlement expressions, which describe with arbitrarily fine granularity which users and user types may access the data.

The non-patent literature to Ives et al., titled "An XML query engine for network-bound data," generally discloses how XML documents are modeled using a tree structure.

The above-mentioned prior art fail to provide for a solution that incorporates advantages of both the physical and logical storage architectures. Whatever the precise merits, features, and advantages of the above cited references, none of them achieves or fulfills the purposes of the present invention.

SUMMARY OF THE INVENTION

The present invention provides for a dynamic storage architecture for hierarchical data, wherein such an architecture is used to store parsed documents (e.g., XML documents) and manage their traversals, prefetches, updates, and reorganization. Nodes of a document are assigned Node IDs based on the extensible decimal identification system for ordered nodes, wherein Node IDs encode parent child relationships and new Node IDs are assigned to new nodes without affecting existing Node IDs.

The architecture groups sets of nodes in Node ID order forming ranges of Node IDs. The ranges are written to blocks. The highest Node ID (or, alternatively, lowest Node ID or a computed Node ID key) in a range and the block's Block ID are entered into a Node ID Range Index. Physical links exist between nodes in the same range while logical links, in the form of index entries in the Node ID Range Index, exist between nodes in different ranges. This architecture allows for single to multiple ranges per block as well as single to multiple subtree roots per range.

Node traversals within ranges are accomplished via physical links, while node traversals between ranges are accomplished via index lookups based on Node IDs. Updates in the hierarchy only affect the ranges that contain the nodes being updated and no other ranges because of the logical links maintained between ranges. The Node ID Range Index enables inter-range node traversals as well as prefetching of blocks containing ranges based on Node ID order.

BRIEF DESCRIPTION OF THE DRAWINGS

FIG. 1 illustrates an exemplary embodiment of the present invention's dynamic storage architecture for hierarchical data.

FIGS. 15 through 19a-b collectively illustrate the insertion of an XML document as per the teaching of the present invention.

DESCRIPTION OF THE PREFERRED EMBODIMENTS

Figure 2:
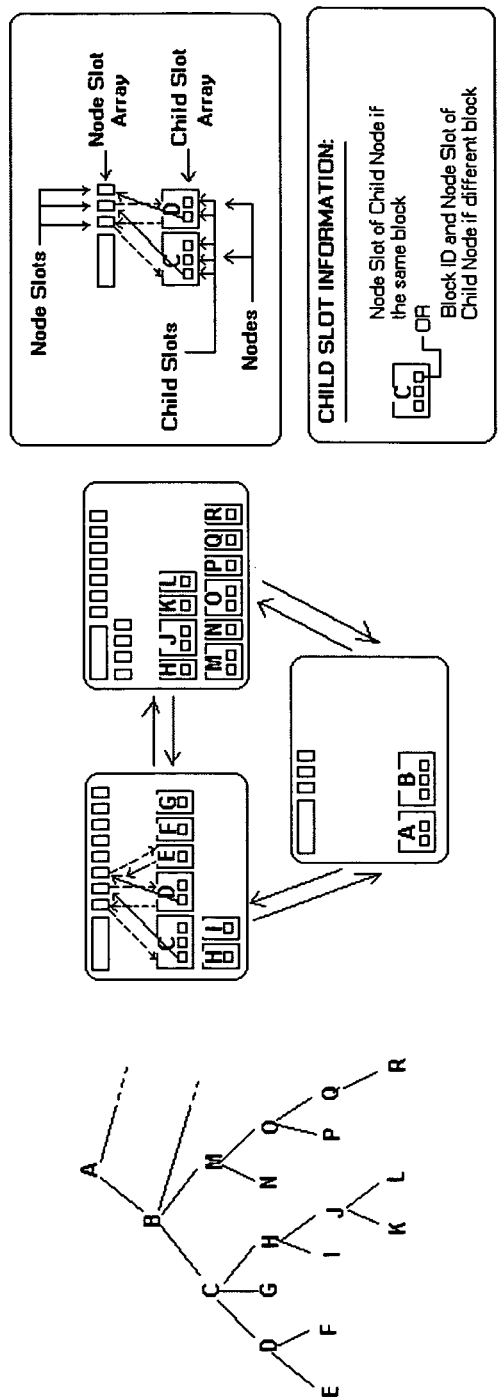
FIG. 2 illustrates the physical storage architecture, wherein physical links exist between nodes in the same block as well as nodes in different blocks.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides a dynamic storage architecture for hierarchical data, wherein such an architecture can be used to store parsed documents, such as parsed XML documents. The disclosed storage architecture allows for prefetching relevant parts of a document based on the document order, and allows for easy updating and reorganization of the document. This storage architecture has the advantages of a physical architecture because physical links between nodes in the same block allow for fast traversals, and the storage architecture also has the advantages of a logical architecture because logical links between nodes in different blocks allow for easier updating, versioning and reorganization.

FIG. 1 illustrates an exemplary embodiment of the present invention's dynamic storage architecture for hierarchical data, wherein such an architecture is used to store parsed documents (e.g., XML documents) and manage their traversals, prefetches, updates, and reorganization. Nodes of a document are assigned Node IDs based on the extensible decimal identification system for ordered nodes, wherein Node IDs encode parent child relationships and new Node IDs are assigned to new nodes without affecting existing Node IDs.

The architecture groups sets of nodes in Node ID order forming ranges of Node IDs. The ranges are written to blocks. The highest Node ID in a range and the block's Block ID are entered into a Node ID Range Index. It should be noted that although a specific example of entering the highest Node ID (in the Node ID range index) is provided, other examples such as entering a lowest Node ID or a computed Node ID key is within the scope of the present invention. For example, if a set of nodes had the following Node IDs: 1.2, 1.2.4.5, 1.2.4.5.5.5.5, then the highest key would be 1.2.4.5.5.5.5 and the lowest key would be 1.2. A computed key would be 1.2.x, where 'x' is higher than any number.

Physical links exist between nodes in the same range while logical links, in the form of index entries in the Node ID Range Index, exist between nodes in different ranges. This architecture allows for single to multiple ranges per block as well as single to multiple subtree roots per range.

In FIG. 1, nodes 'C' to 'I' form a range and are written to a block. The highest NodeID in this range, 1.1.1.3.1 (corresponding to node 'I'), requires an index entry in the Node ID Range Index. This range has one root in 'C'. The next range 'J' to 'R' is written to another block. This requires the index entry 1.1.2.2.2.1 for 'R'. This range has two roots in 'J' and 'M'.

Node traversals within ranges are accomplished via physical links, while node traversals between ranges are accomplished via index lookups based on Node IDs. For example in FIG. 1, to traverse from 1.1 'B' to 1.1.1 'C', an index lookup to find 1.1.1 'C' is required and results in the use of the index entry with the high key 1.1.1.3. Updates in the hierarchy only affect the ranges that contain the nodes being updated and no other ranges because of the logical links maintained between ranges. The Node ID Range Index enables inter-range node traversals as well as prefetching of blocks containing ranges based on Node ID order. The architecture of FIG. 1 uses features of physical storage and logical storage architectures.

FIG. 2 illustrates the physical storage architecture, wherein physical links exist between nodes in the same block as well as nodes in different blocks. A block contains a Node Slot Array and a set of Nodes. Each Node Slot points to a Node. Each Node contains a Child Slot Array and each Child Slot points to a Node Slot that points to a Child Node. Each Node also points to a Node Slot that in turn points to its parent Node. This architecture makes updating, reorganizing and versioning difficult, as physical link between nodes in different blocks need to be updated and propagated throughout the hierarchy. Such a physical storage architecture, however, allows for fast node traversals due to physical links.

Figure 3:
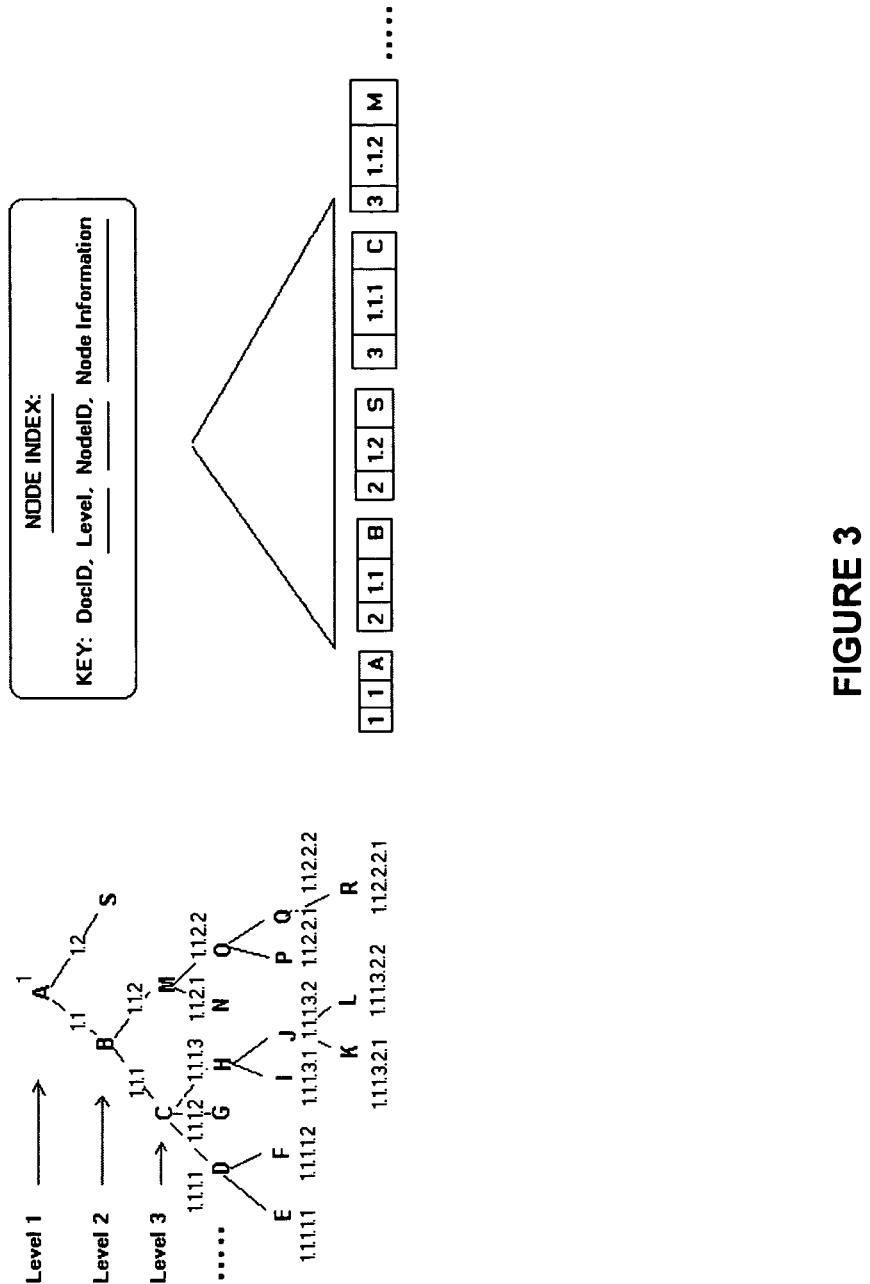
FIG. 3 illustrates the logical storage architecture, wherein each node is stored as a B-tree index entry and assigned a Node ID.

FIG. 3 illustrates the logical storage architecture, wherein each Node is stored as a B-tree index entry and assigned a Node ID. The Node ID B-tree index is based on Node ID order. The parent and children of a node can be found by computing for their Node IDs relative to that node, and searching the index for the index entry with a matching Node ID. This makes node traversals expensive as it requires every traversal to search the B-tree, but it allows easier management of updates and versioning, as only nodes (index entries) being updated are affected. One way to alleviate the cost of node traversals, involves the maintenance of multiple index cursors for different levels of the hierarchy.

The present invention's architecture as depicted in FIG. 1 has the advantages of the physical architecture because physical links between nodes in the same block allow for fast traversals. Similarly, the present invention's architecture of FIG. 1 also has the advantages of the logical architecture because logical links between nodes in different blocks allow for easier updating, versioning and reorganization. Additionally, the present invention's architecture provides the advantage of allowing to prefetch blocks based on document order. As noted earlier, architecture depicted in FIG. 1 allows for single to multiple ranges per block, as well as single to multiple roots per range.

Figure 4:
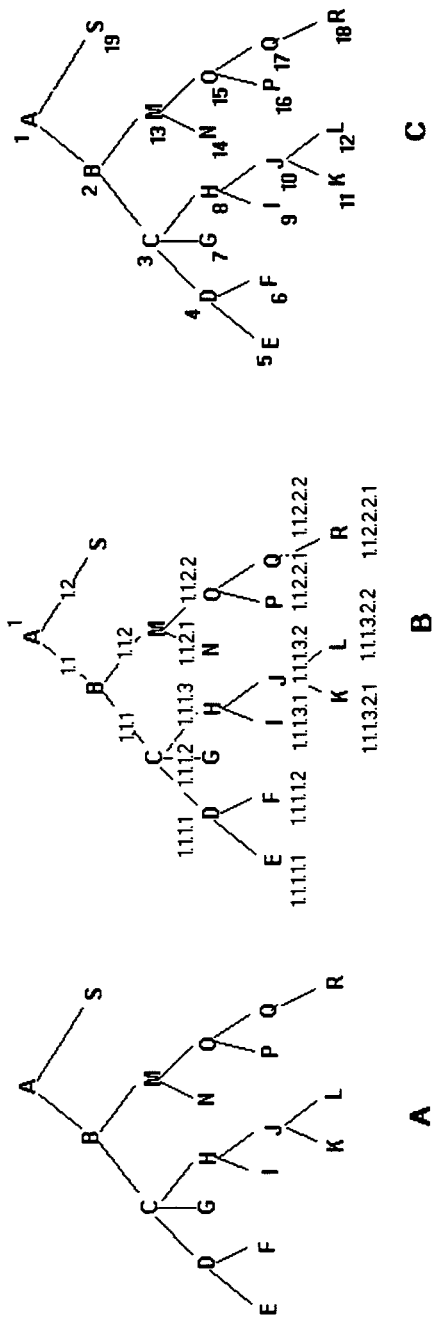
FIGS. 4a-c illustrate the Extensible Decimal Identification System for Ordered Nodes which is used in conjunction with the present invention's storage architecture.
Figure 5:
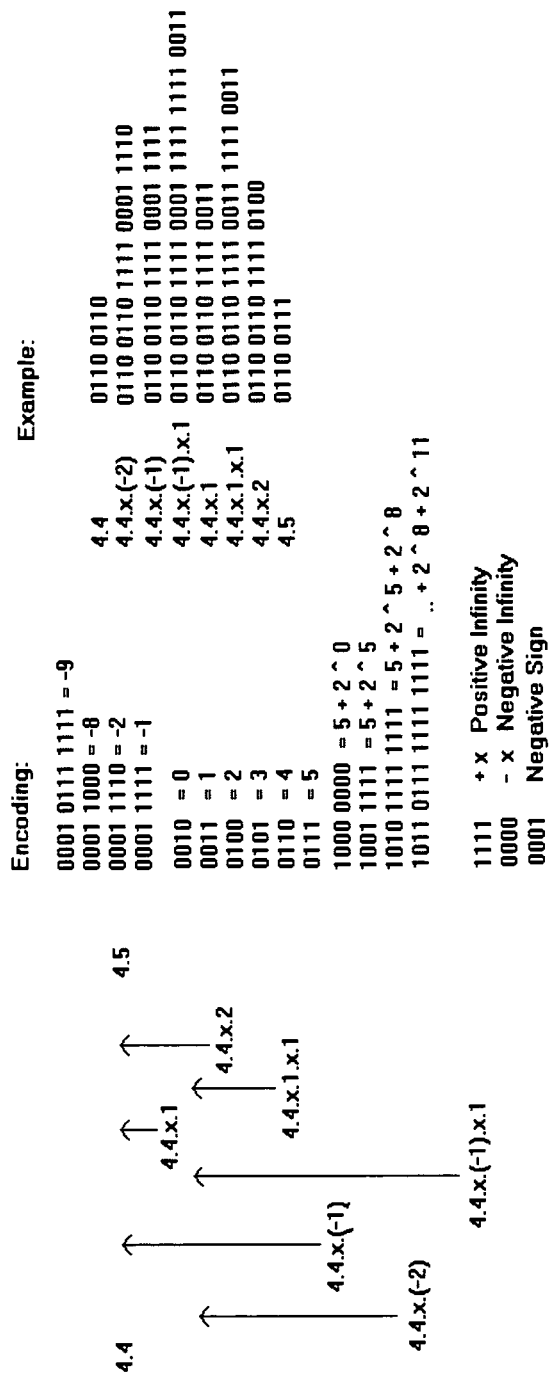
FIG. 5 illustrates how Nodes are inserted in between sibling nodes the Extensible Decimal Identification System for Ordered Nodes.

FIGS. 4a-b illustrate the Extensible Decimal Identification System for Ordered Nodes which is used in conjunction with the present invention's storage architecture, wherein Nodes of a document be assigned Node IDs based on a decimal identification system. In this system, the Node IDs are variable sized, byte comparable, and resemble preorder traversal numbers of the hierarchy, as shown in FIG. 4c. The Node ID of children nodes are formed from the Node ID of parent nodes by appending more digits to the Node ID of the parent. For example, the first child of 'B', 'C' has the Node ID 1.1.1, the second child of 'B', 'M' has the Node ID 1.1.2. The Node ID of the parent node forms the prefix of the Node ID of the children nodes. Nodes that are inserted in between sibling nodes can have more digits following this prefix, forming longer Node IDs as shown in FIG. 5. For example, the sibling node between 4.4 and 4.5 has the Node ID 4.4.x.1. A Child's Node ID digits are the digits following its parents Node ID prefix. For example, the Child Node ID digits for node 'M' is 2.

Figure 6:
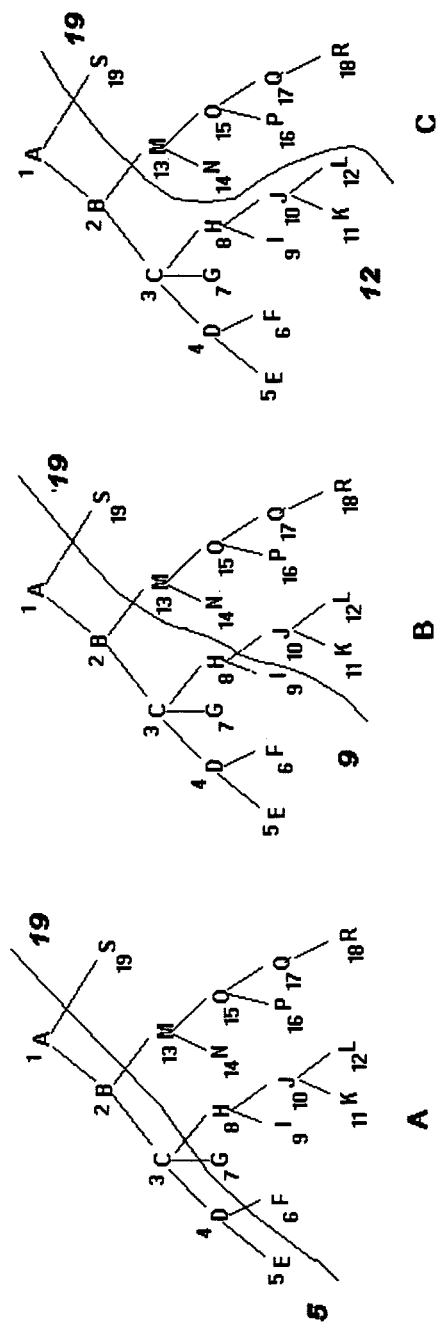
FIGS. 6a-c illustrate how nodes can be grouped in Node ID order.

With Node IDs assigned to every node in the hierarchy, the nodes can now be grouped in Node ID order, as shown in FIGS. 6a-c. Groups of nodes form Node ID ranges that are inserted into blocks. Each range requires an index entry in the Node ID Range Index, with the highest Node ID in the range forming part of the index key. The Node ID in the index key is compared during index lookups to find a target Node ID. The lookup would return the Block ID of the Block containing the node whose Node ID is equal to or less than the highest Node ID. For example in FIG. 6c, the 'O' node would be found in the block pointed to by the Node ID Range Index Entry with the high Node ID of 19.

Figure 7:
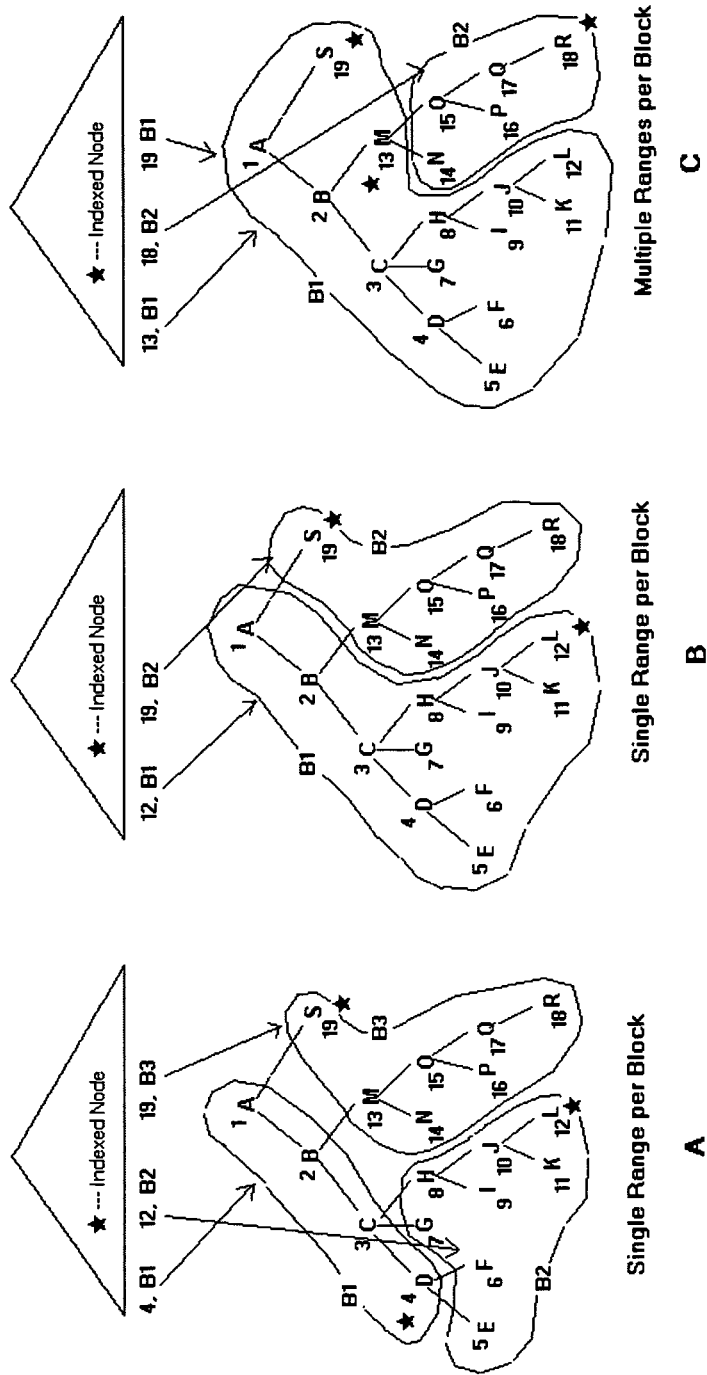
FIGS. 7a-c illustrate the Single Range per Block concept and the Multiple Ranges per Block concept.

FIGS. 7a-c illustrate the Node ID Range Index pointing to Node ID ranges stored in blocks. Some of the ranges are single rooted as in the range stored in block B1 in FIG. 7a, and some of the ranges are multi-rooted as in the ranges stored in blocks B2 and B3 in FIG. 7b. For ranges that are single rooted, the index entry pointing to it points to the one root node or a structure that describes the root node (a roots list of one). For ranges that are multi-rooted, the index entry pointing to it points to a structure (a roots list) that identifies all of the root nodes in the range. Each index entry's key is the highest Node ID within a range. For example, in FIG. 7a, block B1's highest Node ID is 4.

FIGS. 7a-c shows Single Range per Block and Multiple Ranges per Block. Single Range per Block results from blocking of nodes that strictly follow Node ID order. Multiple Ranges per Block results from the blocking of nodes that may not follow Node ID order and results in multiple entries in the Node ID Range Index having the same Block ID payload. For example, in FIG. 7c, there are two index entries that point to block B1, one for the high key 13 and one for the high key 19.

Figure 8:
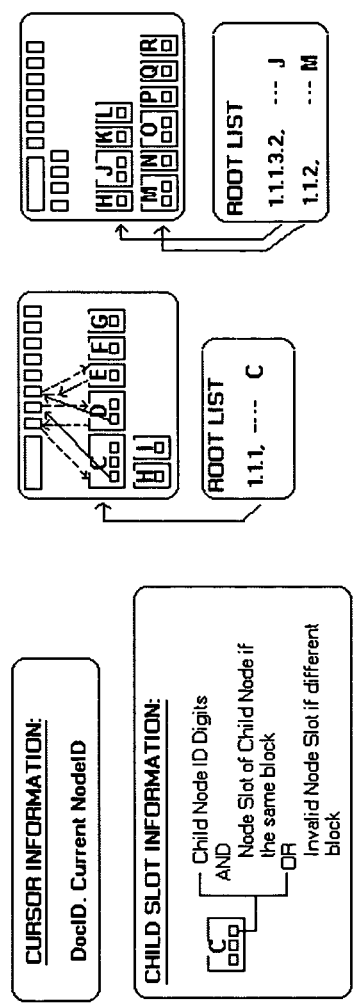
FIG. 8 illustrates the roots list structure encoding the complete Node IDs of root nodes.

In FIG. 8, the roots list structure encodes the complete Node IDs of root nodes. Within each node, Child Slot Entries contains the Child's Node ID digits. Node traversals need to form the Node ID of the next node to be traversed to. This is started by taking the Node ID of the root nodes from the roots list, to form the next Node ID and subsequent Node IDs. To traverse to a parent, the parents Node ID can be retrieved from the prefix of the current Node ID. To traverse to a child, the Child's Node ID can be formed by concatenating the current Node ID with the Child's Node ID digits contained in the Child Slot Entry.

Figure 9:
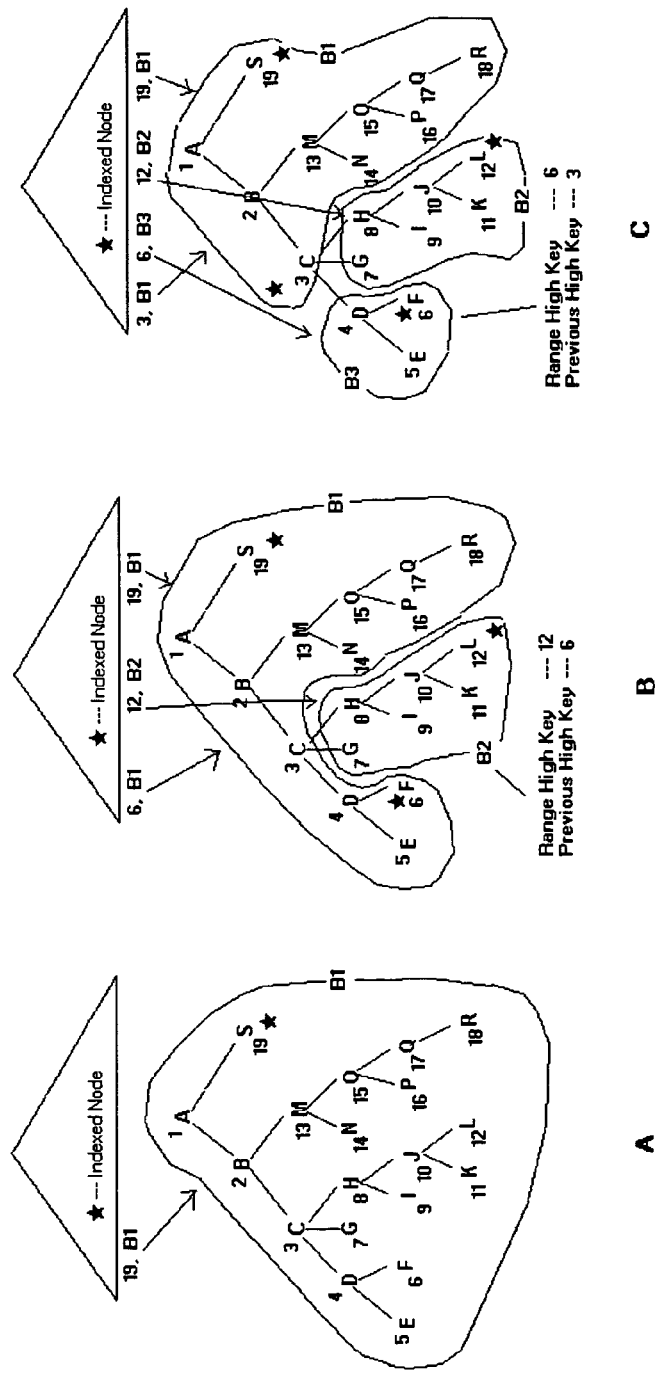
FIGS. 9a-c illustrates range splits that can occur during updates that result in Multiple Ranges per Block.

FIGS. 9a-c illustrates range splits that can occur during updates that result in Multiple Ranges per Block. During each range split, a new index entry is required for the Highest Node ID in the Split Range. Another index entry is required for the Previous High Key. The Previous High Key is the Node ID of the node previous in order to the lowest Node ID in the Split Range. The Previous High Key, can be determined by first finding the node in the Split Range with the lowest Node ID ('G' with Node ID 7 in FIG. 9c and 'D' with Node ID 4 in FIG. 9c). This is the lowest Node ID assigned to the roots of the subtrees in the Split Range. From this node, the previous sibling ('D' with Node ID 4 in FIG. 9c) is traversed to find its last descendant's Node ID ('F' with Node ID 6 in FIG. 9b). If there are no previous siblings, then the immediate parent's Node ID is used ('C' with Node ID 3 in FIG. 9c). This traversal to find the Previous High Key is done within the original block using the physical links. The result is two index entries, one for the Highest Node ID in the split range ('L' in FIG. 9b and 'F' in FIG. 9c) and one for the Previous High Key ('F' in FIG. 9b and 'C' in FIG. 9c). There can be no Previous High Key if the root node of the document is the lowest Node ID'ed node in the Split Range.

It should be noted that all the nodes that have index entries pointing to them are marked as Indexed Nodes. This is so that if the Indexed Node is moved with a set of nodes that have higher Node IDs than the Indexed Node to another block, the index entry corresponding to the Indexed Node can be updated. For example in FIG. 9c, if 'A', 'B', 'C', and 'M' are split, the index entry for 'C' needs to be updated. In FIG. 9c, 'F' is an Indexed Node that moved from B1 to B3, so the index entry for 'F' is updated.

Alternatively, if the Node ID Range Index is always consulted and the current Highest Node ID remembered during an update, then the nodes that are indexed need not be marked, as any node movement will only involve nodes in the range bounded by the current Highest Node ID. For example, the 'M' will never be moved with 'A', 'B', and 'C' because 'C' is the highest Node ID'ed node in the range being updated.

FIGS. 10a-c, 11a-c, FIG. 12, FIG. 13a-c, and FIG. 14a-c illustrate changes to ranges and the range index when subtrees are inserted. Specifically, FIGS. 10a-c and FIG. 11a-c show subtree insertions that do not affect the high key, while FIGS. 13a-c and 14a-c show subtree insertions that does affect the high key.

Figure 10:
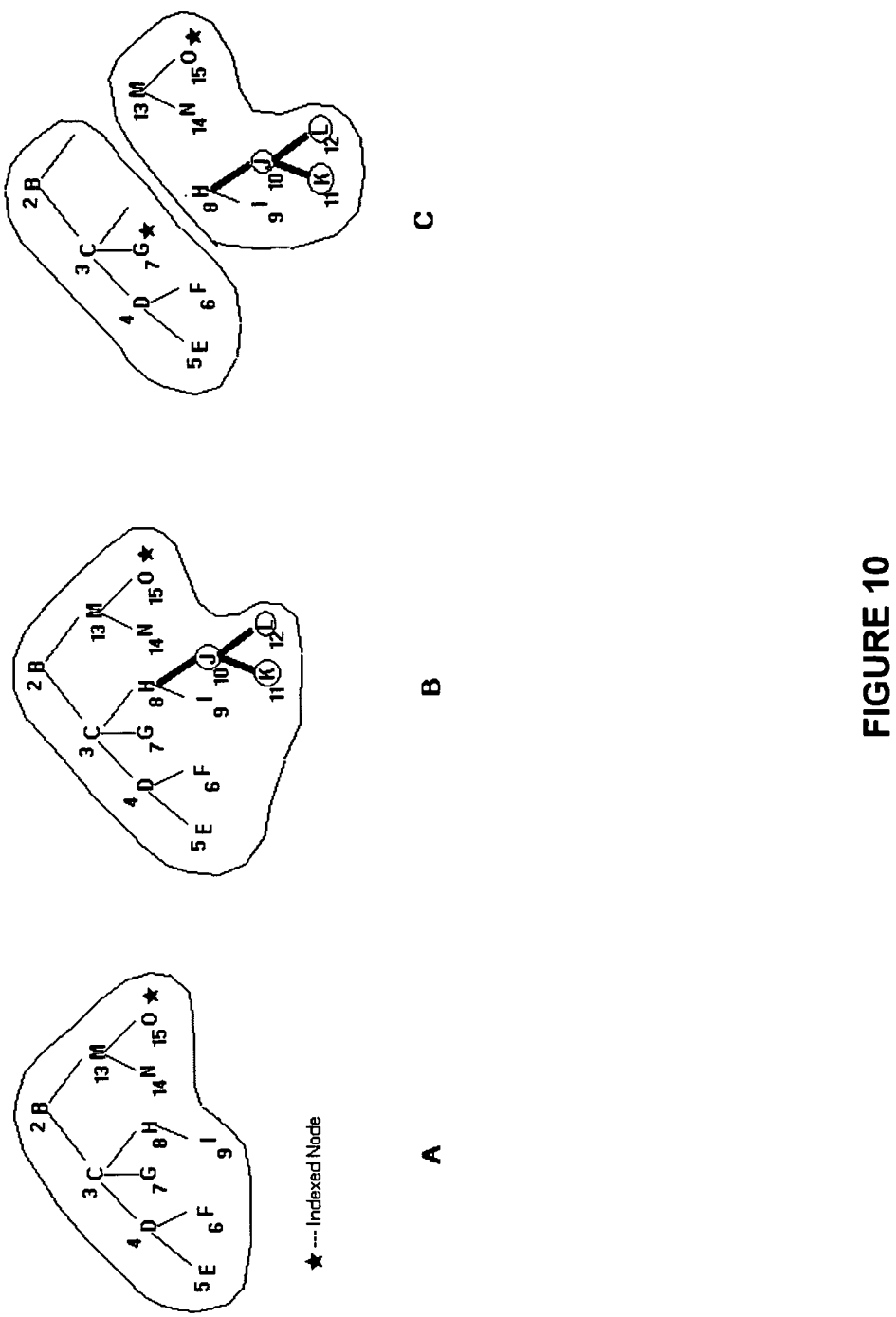
FIGS. 10a-c, 11a-c, FIG. 12, FIG. 13a-c, and FIG. 14a-c illustrate changes to ranges and the range index when subtrees are inserted.

FIG. 10a shows a range with high key 15 'O'. FIG. 10b shows the subtree 'J' being inserted into the range as a child of 'H'. In this case, the subtree inserted fits in the block so no changes are required in the index. In FIG. 10c, the insertion of the subtree 'J' results in the nodes exceeding block capacity and require a range split. FIG. 10c shows how a range split can be accomplished by following strict Node ID order. That is, split points are chosen so that only single ranges per block result.

Figure 11:
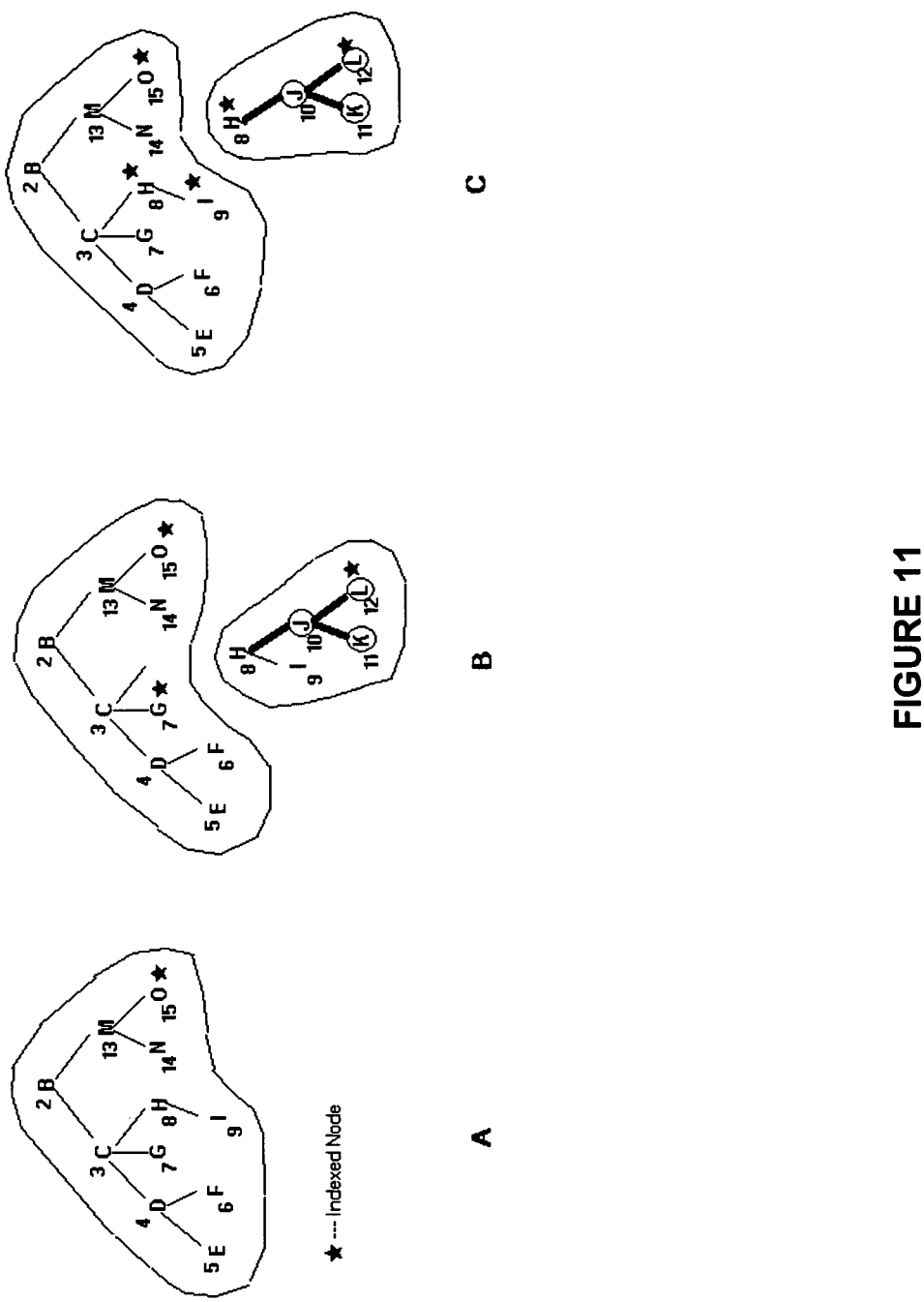

In FIG. 11b, multiple ranges per block result from a range split. In this case, the first block requires two index entries, one for the ranges original high key 15 'O', and one for the Previous High Key of the split range 7 'G'. The split range also requires an index entry for its high key 12 'L'. FIG. 11c shows a different range split strategy, this time splitting the node 'H'. When a node is split, the split part becomes an Out of Order Node and requires an index entry. Because the split part is indexed, the original node, which may still be in Node ID order, also requires an index entry. Lastly, the Previous High Key of the split range 'I' requires an index entry. FIG. 11c shows five index entries (corresponding to high keys 8 'H', 9 'I', and 15 'O' in the first region and high keys 8 'H', and 12 'L' in the second region) created after splitting node 'H'.

Figure 12:
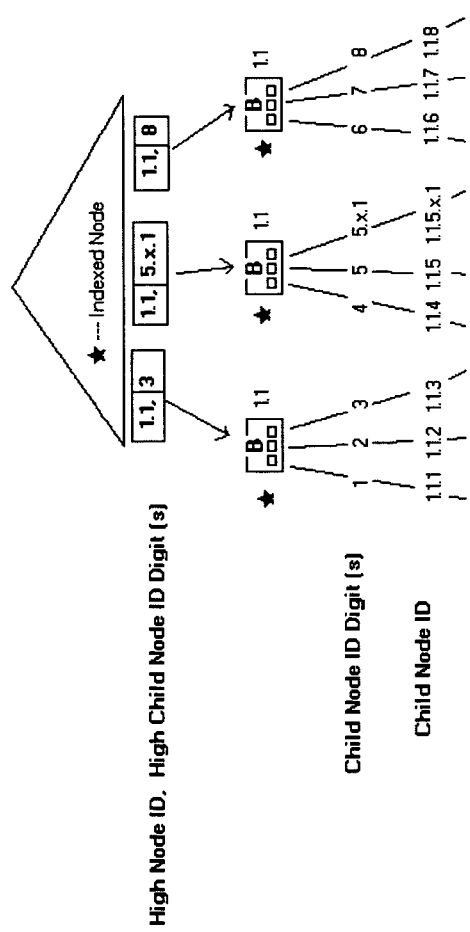

FIG. 12 shows the index entries created when splitting a node. All the nodes have the same Node ID. What distinguishes one from another are their highest Child Node ID digit(s). For example, the first 'B's highest Child Node ID is 1.1.3, so its highest Child Node ID digit is 3. The second 'B's highest Child Node ID is 1.1.5.x.1, so its highest Child Node ID digits are 5.x.1. Nodes may need to be split when the nodes Child Slot Array grows too large to fit in the block.

Figure 13:
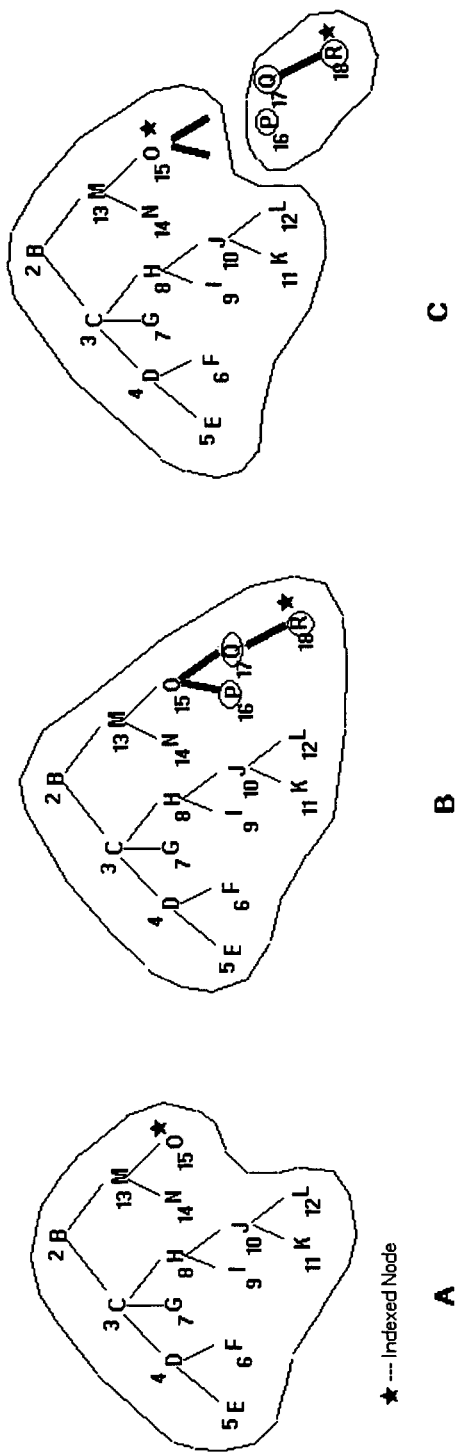
Figure 14:
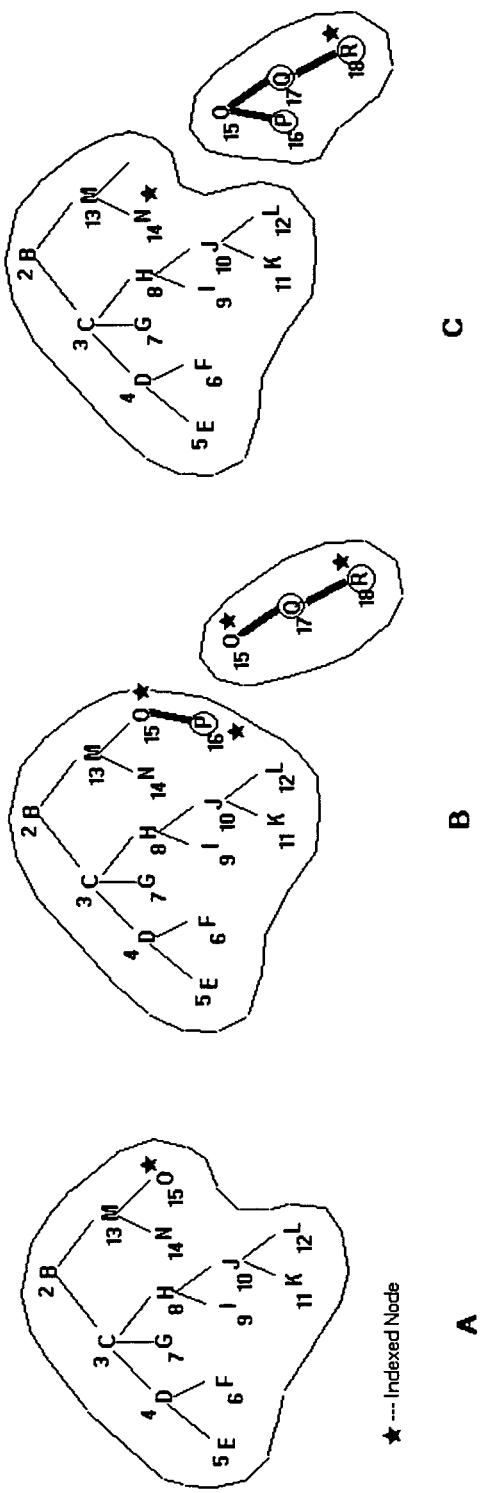

FIG. 13b illustrates a subtree insertion that causes a high key change in an existing range. FIG. 13c illustrates the same subtree insertion requiring a range split. In this case, there is room to grow the child slot array for 'O', but there is no room to contain the children subtrees, so the children subtrees are assigned a different range. FIG. 14b shows a different range split. In this case, the 'O' node is split as well as the range, resulting in 4 index entries. FIG. 14c shows a range split that results in a new high key in the original range.

Figure 15:
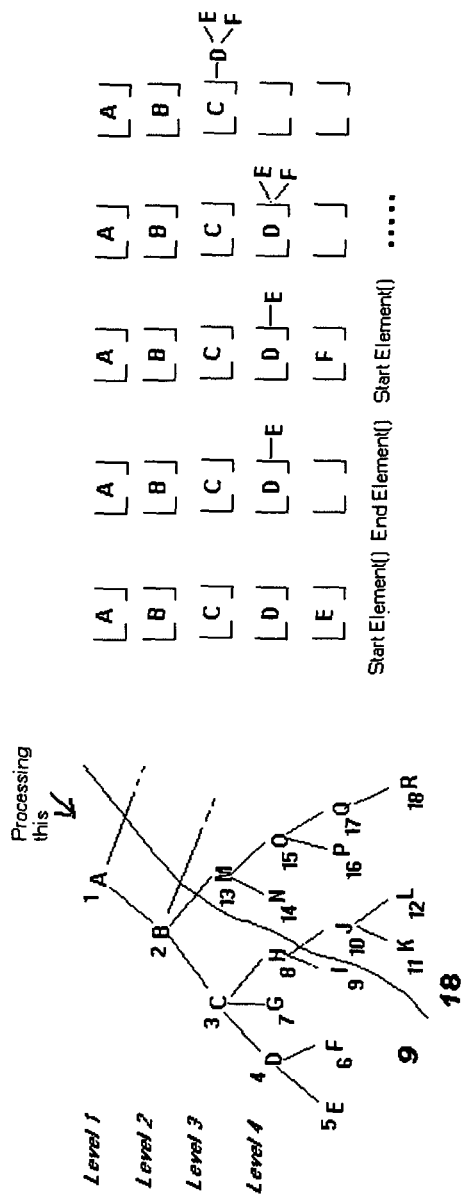

FIGS. 15 through 19a-b collectively illustrate the insertion of an XML document. FIG. 15 shows nodes 'A' to 'F' being processed, as events are received for the document. For every start event of a node, information about that node is kept on the stack. For the end event of a node, the node and its descendants are popped off the stack, and linked with a parent node. The result is a tree of nodes linked with their parent nodes, which is kept on the stack. The nodes kept on the stack are called Incomplete Nodes because their end events are not yet received, which means that there may be more children nodes associated with them.

Figure 16:
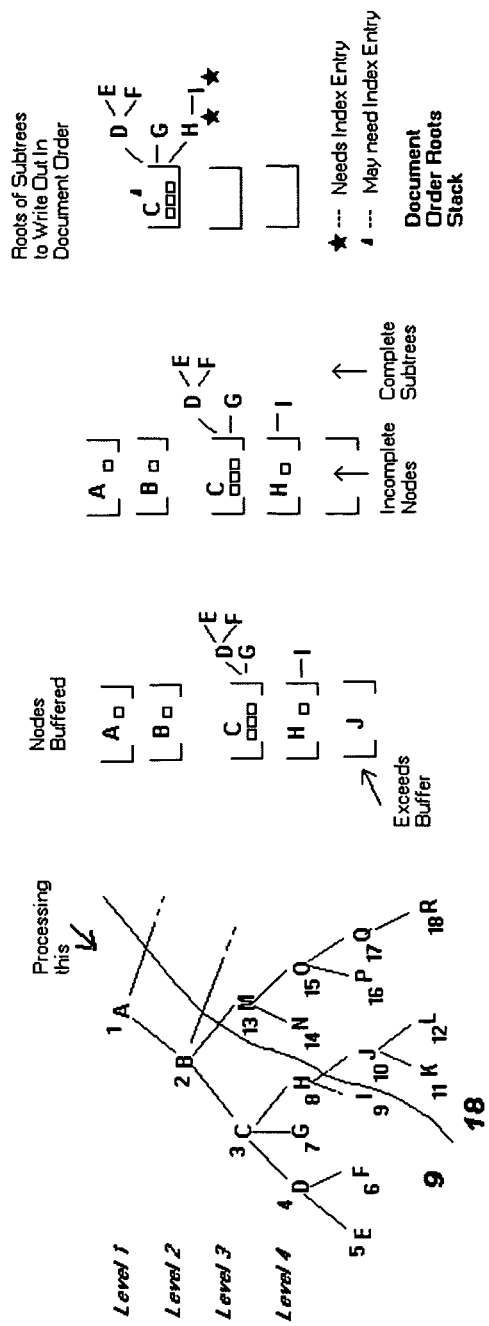

As events for nodes 'A' to 'J' are received shown in FIG. 16, the data for node 'J' exceeds the buffer allocated for the nodes. Now, some of the subtrees on the stack are written out to blocks in storage. FIG. 16 illustrates that the subtree anchored in 'C' was picked. The nodes 'C' and 'H' are incomplete because there may be more children for those nodes. For each incomplete node, one or more index entries may need to be inserted. This is similar to what is required in splitting a node discussed in FIG. 12, except that because a document is being inserted, the insertion of the index entries are deferred, just in case there are no more children for an incomplete node, as in the case for the 'C' node in FIG. 16. The 'C' node is marked incomplete because node traversals need to query the index to see if there is another 'C' node written out. Because the 'H' is being split, this node is marked to be indexed. Node 'I' is marked to be indexed since this is the node with the Highest Node ID.

Figure 17:
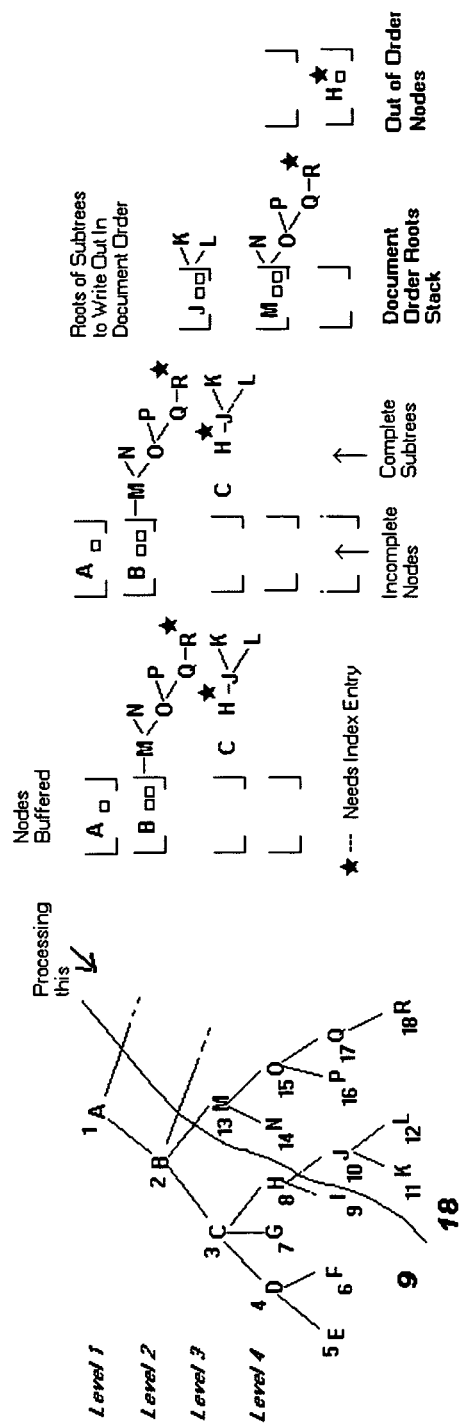
Figure 18:
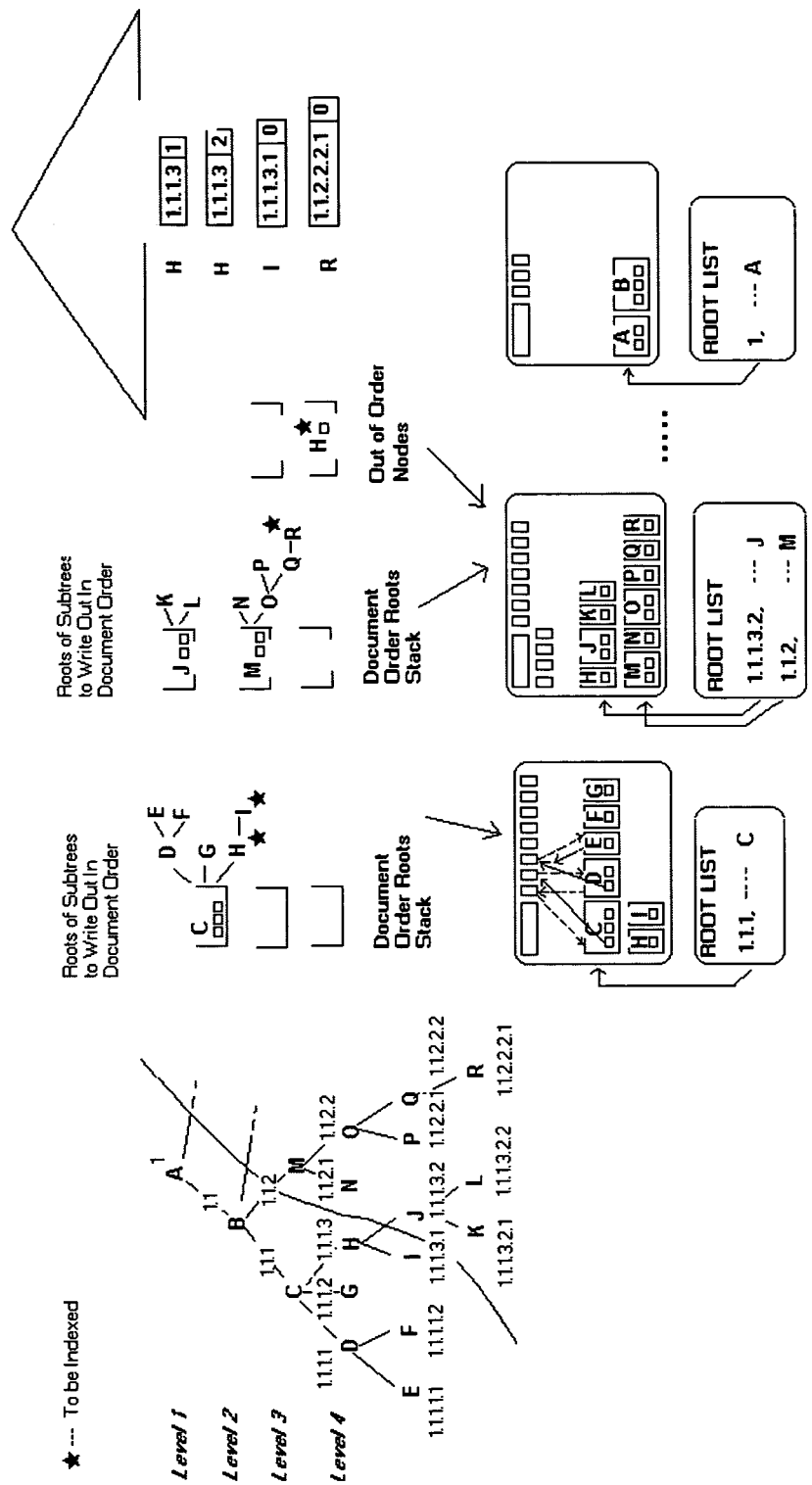
Figure 19:
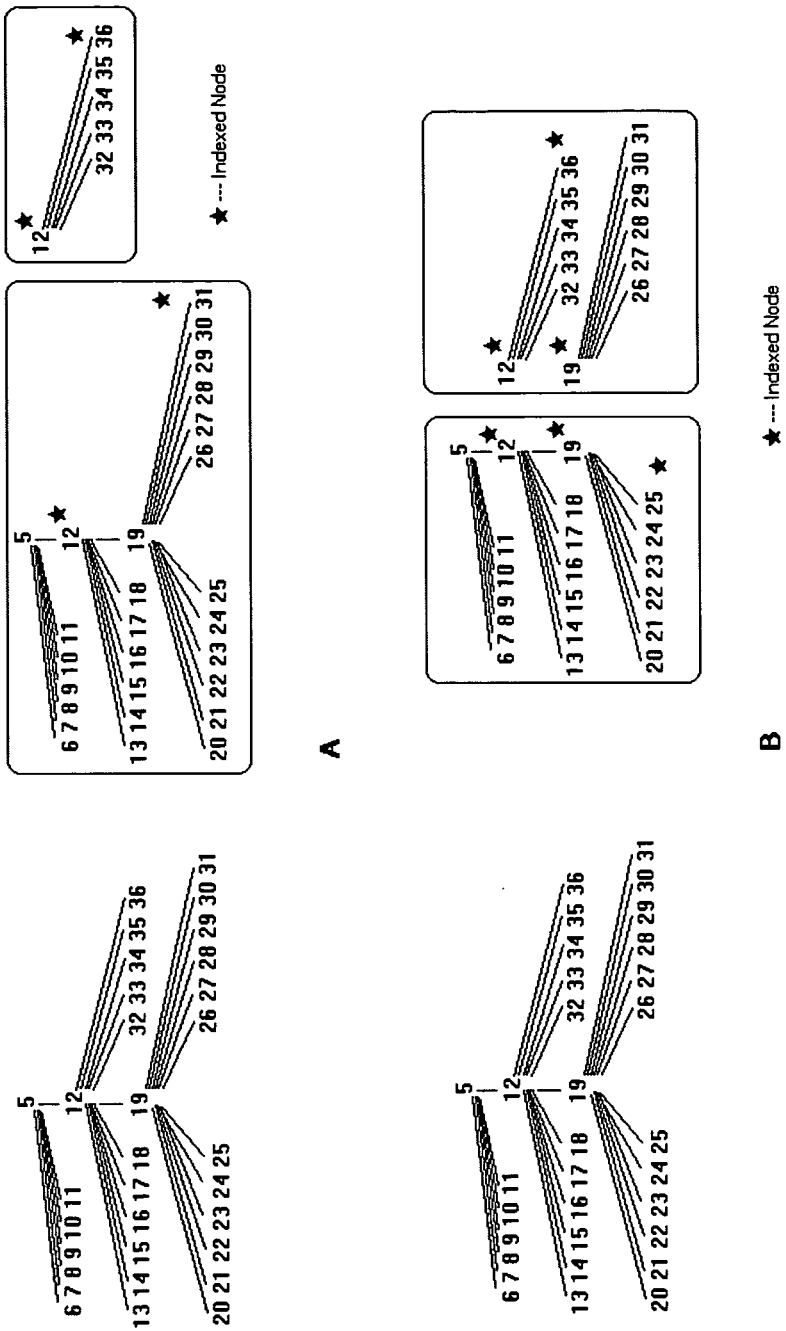

Now, the second set of nodes shown in FIG. 17 is processed, as events for 'K' to 'R' are received. The 'C' node is now removed from the list of nodes that may need an index entry (because an end event was received for it) without adding any children to it. The 'H' node is marked to be indexed because more children have been added to it. In this example, the 'H' node for the first block points to H's first child 'I', while the 'H' node in the second block points to the second child 'J'. Both 'H' nodes are marked to be indexed as in the case for split nodes in FIG. 12. The node with the highest Node ID for the second block, node 'R', is also marked to be indexed. FIG. 18 shows the subtrees written out to blocks and the resulting index entries in the Node ID Range Index.

FIGS. 19a-b illustrate instances during an insertion where nodes can split. In FIG. 19a, node 12 is split between two blocks resulting in 4 index entries. In FIG. 19b, nodes 12 and 19 are split resulting in 6 index entries.

Additionally, the present invention provides for an article of manufacture comprising computer readable program code contained within implementing one or more modules to physically store and manage logical groups of XML nodes. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: grouping sets of nodes in NodeID order to form one or more ranges of Node IDs, wherein each of the ranges are written to a block of memory; (b) maintaining one or more physical links between nodes in a similar range; (c) maintaining an index of entries in a Node ID Range Index, each entry corresponding to a highest node ID (or, alternatively, lowest Node ID or a computed Node ID key) in a range, said index entries defining one or more logical links between nodes in different ranges; and wherein traversals within ranges are accomplished via the physical links and traversals between ranges occur based on an index lookup of NodeIDs.

CONCLUSION

A system and method has been shown in the above embodiments for the effective implementation of a hierarchical storage architecture using node ID ranges. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by type of Node ID recorded in the Node ID Range Index (i.e., Highest Node ID, Lowest Node ID, Computed Node Key, etc.), software/program, or computing environment.

The above enhancements are implemented in various computing environments. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A computer based method for receiving a group of nodes representative of hierarchical data and storing said group of nodes, wherein each node of said group of nodes is assigned a Node ID based on an extensible decimal system, wherein the method comprises:

(a) receiving a markup language based document;
(b) parsing said markup language based document and identifying hierarchical data comprising a group of nodes;
(c) grouping sets of nodes of said group of nodes in Node ID order to form a plurality of ranges of Node IDs, wherein each of said ranges are written to at least one block of memory and writing either a highest Node ID or a lowest Node ID associated with each range in said plurality of ranges to a Node ID Range Index;
(d) generating one or more physical links between nodes within a range in said plurality of ranges;
(e) generating an index of entries in said Node ID Range Index, said index entries defining one or more logical links between nodes of said group of nodes in different ranges within said plurality of ranges, each index entry in said index entries corresponds to any of the following for a given range: a highest Node ID in that given range, a lowest Node ID in that given range, or a computed Node ID key in that given range, wherein when ranges have a single rooted node, an index entry in said index of entries pointing to either said single rooted node or a list describing said single rooted node, and when a given range has multi-rooted nodes, an index entry in said index of entries pointing to a roots list identifying all root nodes in said given range, with each index entry's key being a highest Node ID within said given range;
(f) when receiving instructions to traverse within ranges in said plurality of ranges, traversing within ranges in said plurality of ranges via said physical links, and when receiving instructions to traverse between ranges, traversing between ranges based on an index lookup of Node IDs, and outputting results of such traversal, wherein said Node IDs encode parent child relationships with parent Node IDs being retrieved from prefix of any given Node IDs and said Node ID Range Index used in inter-range node traversals and prefetching blocks containing ranges based on Node ID order, wherein when traversing to a given parent, a Node ID of said given parent is retrieved from a prefix of a current Node ID, and when traversing to a given child, a Node ID of said given child is formed by concatenating said current Node ID with Node ID digits of said given child, and
(g) receiving instructions to update said a first block of memory associated with a first range of Node IDs having a first index entry in the Node ID range index of (c);
(h) splitting the first range of Node IDs in (g) into at least a second split range of Node IDs and a third split range of Node IDs;
(i) updating the first index entry in the Node ID range index with a second index entry associated with a highest Node ID within the second split range of NodeIDs, a third index entry associated with a highest Node ID within the third split range of NodeIDs, a fourth index entry associated with a previous high key associated with the second split range of NodeIDs, and a fifth index entry associated with a previous high key associated with the third split range of NodeIDs.

2. The computer-based method of claim 1, wherein said markup language is XML.

3. The computer-based method of claim 1, wherein each block of memory in said at least one block of memory retains multiple ranges of said plurality of ranges.

4. The computer-based method of claim 1, wherein said Node IDs encode parent child relationships and new Node IDs are assigned to new nodes without affecting existing Node IDs.

5. The computer-based of claim 1, wherein updates in hierarchical data affect the range that contains the nodes being updated based on the logical links between nodes of said group of nodes in different ranges within said plurality of ranges.

6. The computer-based method of claim 1, wherein an index entry in said index entries is used to prefetch a block of memory in said at least one block of memory containing said written ranges in (c).

7. The computer-based method of claim 1, wherein said computer-based method is implemented in conjunction with a relational database.

8. The computer-based method of claim 1, wherein said Node IDs are encoded and are byte comparable.

9. A computer based method for receiving a group of nodes representative of hierarchical data and storing said group of nodes, wherein each node of said group of nodes is assigned a Node ID based on an extensible decimal system, wherein the method comprises:
    (a) receiving a markup language based document;
    (b) parsing said markup language based document and identifying hierarchical data comprising a group of nodes;
    (c) grouping sets of nodes of said group of nodes in Node ID order to form a plurality of ranges of Node IDs, wherein each of said ranges are written to at least one block of memory and writing either a highest Node ID or a lowest Node ID associated with each range in said plurality of ranges to a Node ID Range Index;
    (d) generating one or more physical links between nodes within a range in said plurality of ranges;
    (e) generating an index of entries in said Node ID Range Index, said index entries defining one or more logical links between nodes of said group of nodes in different ranges within said plurality of ranges, each index entry in said index entries corresponds to any of the following for a given range: a highest Node ID in that given range, a lowest Node ID in that given range, or a computed Node ID key in that given range, wherein when ranges have a single rooted node, an index entry in said index of entries pointing to either said single rooted node or a list describing said single rooted node, and when a given range has multi-rooted nodes, an index entry in said index of entries pointing to a roots list identifying all root nodes in said given range, with each index entry's key being a highest Node ID within said given range;
    (f) when receiving instructions to traverse within ranges in said plurality of ranges, traversing within ranges in said plurality of ranges via said physical links, and when receiving instructions to traverse between ranges, traversing between ranges based on an index lookup of Node IDs, and outputting results of such traversal, wherein said Node IDs encode parent child relationships with parent Node IDs being retrieved from prefix of any given Node IDs and said Node ID Range Index used in inter-range node traversals and prefetching blocks containing ranges based on Node ID order, wherein when traversing to a given parent, a Node ID of said given parent is retrieved from a prefix of a current Node ID, and when traversing to a given child, a Node ID of said given child is formed by concatenating said current Node ID with Node ID digits of said given child, and (g) receiving instructions to update a first block of memory associated with a first range of Node IDs having a first index entry in the Node ID range index of (c);

(h) splitting the first range of Node IDs in (g) into at least a second split range of Node IDs and a third split range of Node IDs:

(i) updating the first index entry in the Node ID range index with a second index entry associated with a highest Node ID within the second split range of NodeIDs, a third index entry associated with a highest Node ID within the third split range of NodeIDs, a fourth index entry associated with a previous high key associated with the second split range of NodeIDs, and a fifth index entry associated with a previous high key associated with the third split range of NodeIDs, and wherein maintaining said physical links and said logical links combines a physical storage architecture with a logical storage architecture allowing both single to multiple ranges per block and single to multiple roots per range.

10. The computer-based method of claim 9, wherein said markup language is XML.

11. The computer-based method of claim 9, wherein each block of memory in said at least one block of memory retains multiple ranges of said plurality of ranges.

12. The computer-based method of claim 9, wherein said Node IDs encode parent child relationships and new Node IDs are assigned to new nodes without affecting existing Node IDs.

13. The computer-based of claim 9, wherein updates in hierarchical data affect the range that contains the nodes being updated based on the logical links between nodes of said group of nodes in different ranges within said plurality of ranges.

14. The computer-based method of claim 9, wherein an index entry in said index entries is used to prefetch a block of memory in said at least one block of memory containing said written ranges in (c).

15. The computer-based method of claim 9, wherein said computer-based method is implemented in conjunction with a relational database.

16. The computer-based method of claim 9, wherein said Node IDs are encoded and are byte comparable.

* * * * *